US012659375B2

(12) United States Patent
Suini et al.

(10) Patent No.: US 12,659,375 B2
(45) Date of Patent: Jun. 16, 2026

(54) RESPONSIVE METAVERSE CONTENT

(71) Applicant: Accenture Global Solutions Limited, Dublin (IE)

(72) Inventors: Jeremy Suini, Antibes (FR); Jean-Dominique Hoyami, Sophia Antipolis Cedex (FR); Jean-Baptiste Delinselle, Juan les Pins (FR); Stephanie Bisgaard, Le Plan de Grasse (FR)

(73) Assignee: Accenture Global Solutions Limited, Dublin (IE)

( * ) Notice: Subject to any disclaimer, the term of this patent is extended or adjusted under 35 U.S.C. 154(b) by 677 days.

(21) Appl. No.: 18/186,350

(22) Filed: Mar. 20, 2023

(65) Prior Publication Data

US 2024/0323259 A1     Sep. 26, 2024

(51) Int. Cl.
*H04L 67/00*     (2022.01)
*H04L 67/131*     (2022.01)
*H04L 67/565*     (2022.01)

(52) U.S. Cl.
CPC .......... *H04L 67/131* (2022.05); *H04L 67/565* (2022.05)

(58) Field of Classification Search
None
See application file for complete search history.

(56) References Cited

U.S. PATENT DOCUMENTS

| | | | | |
|---|---|---|---|---|
| 6,512,520 | B1* | 1/2003 | Naka ................ | H04N 21/47205 |
| | | | | 345/473 |
| 7,873,742 | B1* | 1/2011 | Orvendal .............. | H04L 67/303 |
| | | | | 707/613 |
| 9,363,569 | B1* | 6/2016 | van Hoff .............. | H04N 13/271 |
| 9,674,714 | B2* | 6/2017 | Francisco ........ | H04N 21/43635 |
| 2007/0055685 | A1* | 3/2007 | Abramson .............. | G06F 9/451 |
| | | | | 707/999.102 |
| 2009/0177977 | A1* | 7/2009 | Jones ...................... | G06N 3/006 |
| | | | | 715/753 |
| 2012/0324490 | A1* | 12/2012 | Hwang .................. | H04N 21/61 |
| | | | | 725/9 |
| 2014/0082526 | A1* | 3/2014 | Park ...................... | H04L 65/403 |
| | | | | 715/757 |
| 2015/0058102 | A1* | 2/2015 | Christensen ......... | G11B 31/006 |
| | | | | 705/14.6 |
| 2015/0321107 | A1* | 11/2015 | Park ........................ | A63F 9/143 |
| | | | | 472/60 |
| 2016/0035016 | A1* | 2/2016 | Spio ...................... | G06Q 50/01 |
| | | | | 705/27.2 |
| 2016/0098860 | A1* | 4/2016 | Basra .................... | H04L 67/131 |
| | | | | 345/633 |

(Continued)

*Primary Examiner* — Martin Mushambo
(74) *Attorney, Agent, or Firm* — Seed Intellectual Property Law Group LLP

(57) ABSTRACT

In some implementations, a user device may receive input indicating metaverse content. Accordingly, the user device may transmit, to a remote service, a request for the metaverse content. The user device may additionally transmit, to the remote service, at least one capability indication associated with the user device and at least one preference associated with a user of the user device. The user device may receive, from the remote service and in response to the request, one or more packets encoding the metaverse content. A format of the metaverse content is based on the at least one capability indication and the at least one preference.

19 Claims, 16 Drawing Sheets

(56)  References Cited

U.S. PATENT DOCUMENTS

| | | | | |
|---|---|---|---|---|
| 2018/0359189 A1* | 12/2018 | Ye | .......................... | H04N 23/698 |
| 2019/0266800 A1* | 8/2019 | Khalid | ............. | H04N 21/44008 |
| 2020/0005540 A1* | 1/2020 | Challagolla | ............. | G06T 19/20 |
| 2020/0153918 A1* | 5/2020 | Laird-Mcconnell | .... | H04L 51/02 |
| 2020/0218329 A1* | 7/2020 | Nagarajan | ................. | G06F 1/28 |
| 2020/0265614 A1* | 8/2020 | Jung | ........................ | G06T 11/00 |
| 2021/0266510 A1* | 8/2021 | Hayashi | .................. | G06F 1/163 |
| 2021/0312887 A1* | 10/2021 | Griswold | .............. | G06T 19/006 |
| 2022/0172604 A1* | 6/2022 | Guzik | ..................... | H04L 67/12 |
| 2022/0200924 A1* | 6/2022 | Lu | ......................... | H04B 7/0452 |
| 2022/0237876 A1* | 7/2022 | Yoo | .......................... | G06T 7/246 |
| 2023/0141545 A1* | 5/2023 | Spoerri | .................. | H04W 4/02 |
| | | | | 345/419 |
| 2023/0145605 A1* | 5/2023 | Shah | ........................ | H04L 65/75 |
| | | | | 709/201 |
| 2023/0186572 A1* | 6/2023 | Jeong | ................... | G06T 19/006 |
| | | | | 345/419 |
| 2023/0206570 A1* | 6/2023 | Bae | ........................ | G06T 19/006 |
| | | | | 345/633 |
| 2023/0230041 A1* | 7/2023 | Kim | ..................... | G06Q 10/103 |
| | | | | 705/14.11 |
| 2023/0238098 A1* | 7/2023 | Langan | .................. | G16H 20/10 |
| | | | | 345/156 |
| 2023/0368794 A1* | 11/2023 | Karp | ........................ | G10L 15/26 |
| 2024/0037832 A1* | 2/2024 | Park | ......................... | G06T 13/40 |

* cited by examiner

200

215
Select format

205
Request for
metaverse content

210
Capability indication

Remote service

First user device

200

255
Select format

Remote service

250
Capability indication

Second user device

300

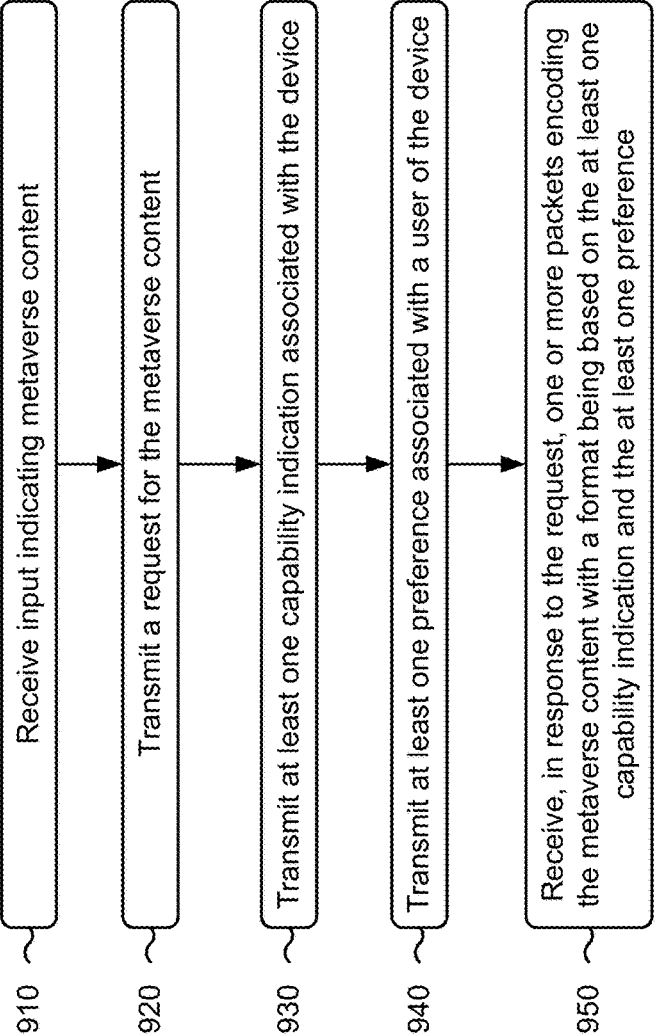

910 Receive input indicating metaverse content

920 Transmit a request for the metaverse content

930 Transmit at least one capability indication associated with the device

940 Transmit at least one preference associated with a user of the device

950 Receive, in response to the request, one or more packets encoding the metaverse content with a format being based on the at least one capability indication and the at least one preference

1000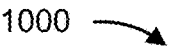

1010 — | Receive, from a first user device, a request for metaverse content |

1020 — | Receive, from the first user device, a first capability indication associated with the first user device |

1030 — | Select a first format for the metaverse content based on the first capability indication |

1040 — | Transmit, to the first user device and in response to the request for the metaverse content, one or more first packets encoding the metaverse content according to the first format |

1050 — | Receive, from a second user device, a request to continue the metaverse content |

1060 — | Receive, from the second user device, a second capability indication associated with the second user device |

1070 — | Select a second format for the metaverse content based on the second capability indication |

1080 — | Transmit, to the second user device and in response to the request to continue the metaverse content, one or more second packets encoding the metaverse content according to the second format |

FIG. 10

RESPONSIVE METAVERSE CONTENT

BACKGROUND

As the metaverse expands, different types of user devices will connect to remote services to provide metaverse content. For example, metaverse content may be provided on virtual reality devices (e.g., Oculus® devices), augmented reality devices (e.g., smartphones), and integrated systems (e.g., vehicle infotainment systems), among other examples.

SUMMARY

Some implementations described herein relate to a method. The method may include receiving, at a device, input indicating metaverse content. The method may include transmitting, to a remote service, a request for the metaverse content. The method may include transmitting, to the remote service, at least one capability indication associated with the device. The method may include transmitting, to the remote service, at least one preference associated with a user of the device. The method may include receiving, from the remote service and in response to the request, one or more packets encoding the metaverse content, wherein a format of the metaverse content is based on the at least one capability indication and the at least one preference.

Some implementations described herein relate to a device. The device may include one or more memories and one or more processors communicatively coupled to the one or more memories. The one or more processors may be configured to receive, from a first user device, a request for metaverse content. The one or more processors may be configured to receive, from the first user device, a first capability indication associated with the first user device. The one or more processors may be configured to select a first format for the metaverse content based on the first capability indication. The one or more processors may be configured to transmit, to the first user device and in response to the request for the metaverse content, one or more first packets encoding the metaverse content according to the first format. The one or more processors may be configured to receive, from a second user device, a request to continue the metaverse content. The one or more processors may be configured to receive, from the second user device, a second capability indication associated with the second user device. The one or more processors may be configured to select a second format for the metaverse content based on the second capability indication. The one or more processors may be configured to transmit, to the second user device and in response to the request to continue the metaverse content, one or more second packets encoding the metaverse content according to the second format.

Some implementations described herein relate to a non-transitory computer-readable medium that stores a set of instructions. The set of instructions, when executed by one or more processors of a device, may cause the device to receive, from a user device, a request for metaverse content. The set of instructions, when executed by one or more processors of the device, may cause the device to receive, from the user device, at least one capability indication associated with the user device. The set of instructions, when executed by one or more processors of the device, may cause the device to receive at least one preference associated with a user of the user device. The set of instructions, when executed by one or more processors of the device, may cause the device to select a format for the metaverse content based on the at least one capability indication and the at least one preference. The set of instructions, when executed by one or more processors of the device, may cause the device to transmit, to the user device and in response to the request, one or more packets encoding the metaverse content according to the format.

BRIEF DESCRIPTION OF THE DRAWINGS

FIG. 9 is a flowchart of an example process relating to device-specific metaverse content.

FIG. 10 is a flowchart of an example process relating to continuing metaverse content across devices.

DETAILED DESCRIPTION

Figure 1A:
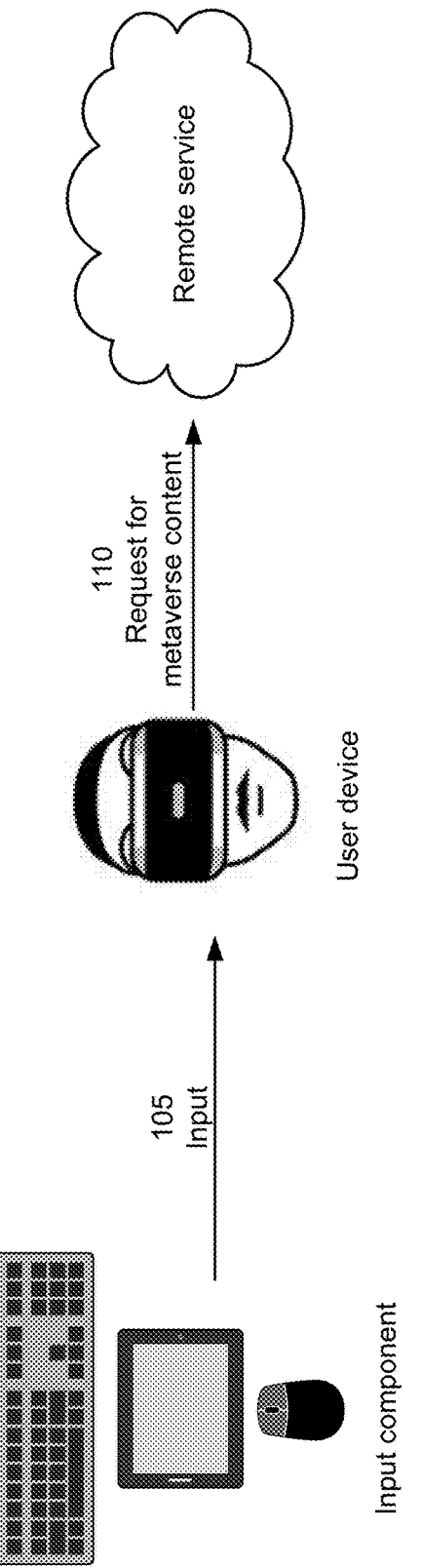
FIGS. 1A-1C are diagrams of an example implementation described herein.

The following detailed description of example implementations refers to the accompanying drawings. The same reference numbers in different drawings may identify the same or similar elements.

Metaverse content may be provided on different types of devices, such as virtual reality (VR) devices, augmented reality (AR) devices, desktop computers, and vehicle infotainment systems, among other examples. As used herein, "metaverse content" refers to multimedia content (including visual content, audio content, or a combination thereof) that is interactive (that is, changes in response to input from a user). Additionally, the user may use different accessories when accessing metaverse content. For example, the user may use wireless headphones while exercising but use a wired headset while resting. In another example, the user may use a desktop computer with a wired Internet connection at home but use a laptop computer with a wireless Internet connection while traveling.

Customizing metaverse content to device capabilities provides technical improvements and improves a user's experience. Some implementations described herein enable a remote service to select a format for metaverse content based on capability indications from a user device. As a result, power is conserved for some devices (e.g., battery-powered devices), dropped packets are reduced for some devices (e.g., wireless devices and other devices with smaller throughput), and processing resources are conserved for some devices (e.g., by refraining from providing packets associated with capabilities that the devices do not possess). Additionally, in some implementations, the remote service may further select the format for the metaverse content based on preferences associated with the user. As a result, power is conserved for some users (e.g., environmentally-aware users), and processing resources are conserved for some users (e.g., by refraining from providing packets that would not be helpful due to the users' disabilities).

Some metaverse content may be associated with an experience, such as a shopping experience, a collaborative experience, or a social experience, among other examples. Accordingly, the user generally has to terminate the experience when leaving a user device provisioning the experience. For example, the user may place their smartphone in their pocket while driving and thus terminate the experience. In another example, the user may depart their home, which houses a desktop computer, and thus terminate the experience. Restarting the experience on a different user device costs power and processing resources at the new user device as well as at a remote service providing the metaverse content.

Continuing a metaverse experience across devices provides technical improvements and improves a user's experience. Some implementations described herein enable a remote service to continue metaverse content on a second user device from a first user device. As a result, the remote service conserves power and processing resources that otherwise would have been consumed in terminating the metaverse content on the first user device and restarting the metaverse content on the second user device. Additionally, the remote service may customize the metaverse content to both the first user device and the second user device. As a result, power is conserved for some devices, dropped packets are reduced for some devices, and processing resources are conserved for some devices, as described above.

Figure 1B:
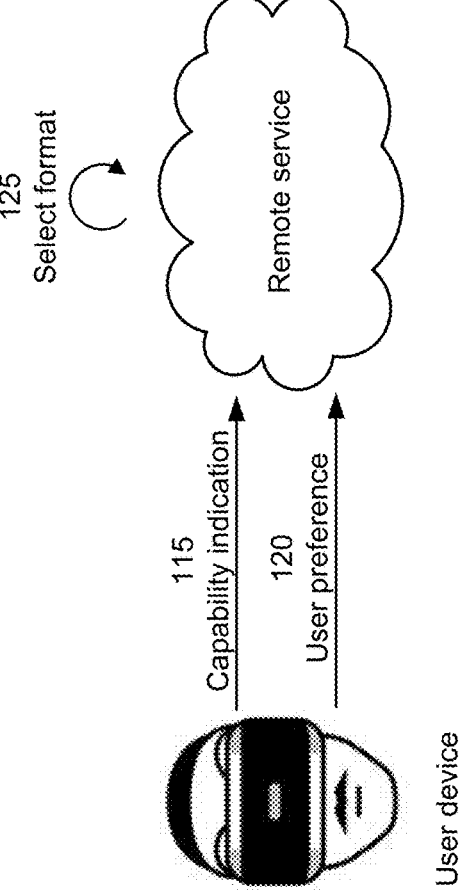
Figure 1C:
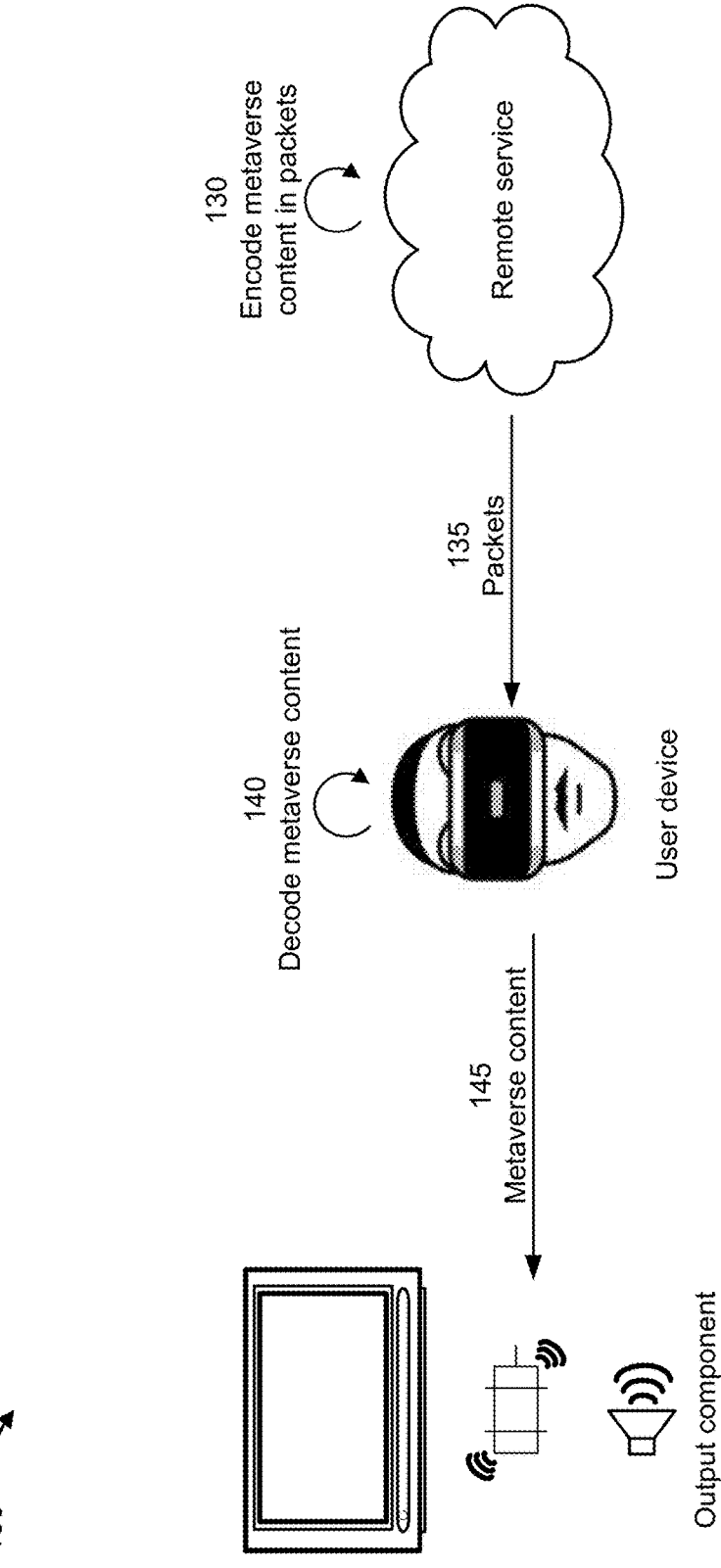

FIGS. 1A-1C are diagrams of an example implementation 100 associated with providing device-specific metaverse content. As shown in FIGS. 1A-1C, example implementation 100 includes a user device and a remote service. These devices are described in more detail below in connection with FIG. 7 and FIG. 8.

As shown in FIG. 1A and by reference number 105, the user device may receive (e.g., using an input component, such as a keyboard, a mouse, a touchscreen, a microphone, or another type of input component) input that indicates metaverse content. For example, a user of the user device may interact with a user interface (UI) generated by software executed by the user device (e.g., an operating system (OS) or an application supported by the OS) such that the input includes a signal generated by the interaction. In another example, the user may speak a voice command into the user device such that the input includes a signal generated by audio.

The input may indicate the metaverse content with a uniform resource locator (URL), an Internet protocol (IP) address, or another indication of the metaverse content relative to a network. For example, the user may interact with a web browser (or another type of application executed by the user device) to input the URL or the IP address. Additionally, or alternatively, the input may indicate a selection of the metaverse content from a plurality of possible options. For example, the user may interact with a menu (whether visual or auditory) to input the selection.

As shown by reference number 110, the user device may transmit, and the remote service may receive, a request for the metaverse content. The request may be included in a hypertext transfer protocol (HTTP) message transmitted to the remote service. Additionally, or alternatively, the user device may perform a call to an application programming interface (API) function provided by the remote service such that the API call is the request. The request may include an indication of the metaverse content, such as a URL associated with the metaverse content, an IP address associated with the metaverse content, a title (or another type of string indicator) associated with the metaverse content, and/or an index (or another type of alphanumeric identifier) associated with the metaverse content, among other examples.

As shown in FIG. 1B and by reference number 115, the user device may additionally transmit, and the remote service may receive, a capability indication (e.g., at least one capability indication) associated with the user device. For example, the capability indication may include a data structure as described in connection with FIG. 3. In some implementations, the capability indication may expressly indicate a property (e.g., at least one property) of the user device (e.g., a battery level, a computing power, a connection status, a screen size, a haptic capability, or an audio capability, among other examples). Additionally, or alternatively, the capability indication may indicate a model number, a serial number, and/or another type of indicator associated with the user device. Accordingly, the remote service may use a database (stored on a local memory of the remote service or stored at least partially external to the remote service, whether virtually, logically, and/or physically) to lookup the property of the user device using a query with the indicator associated with the user device.

As an example, the capability indication may be associated with a battery level of the user device. Accordingly, the capability indication may include a charged percentage (or an estimated time remaining) for the battery, a total capacity of the battery, and/or a charging status of the battery, among other examples. Additionally, or alternatively, the capability indication may be associated with a computing power of the user device. Accordingly, the capability indication may include a maximum clock speed (e.g., in gigahertz (GHz)), an average clock speed, a number of processor cores, an indication of multi-threading capability, and/or an indication of any special-purpose processors, among other examples. Additionally, or alternatively, the capability indication may be associated with a connection status of the user device. Accordingly, the capability indication may include a connection type (e.g., cellular, WiFi®, Bluetooth®, or wired, among other examples), a connection strength (e.g., a reference signal received power (RSRP) for wireless connections), a maximum download speed, an average download speed, a maximum upload speed, an average upload speed, and/or a latency measurement (e.g., a ping rate), among other examples. Additionally, or alternatively, the capability indication may be associated with a screen size of the user device. Accordingly, the capability indication may include a physical measurement associated with a display of the user device (e.g., in inches and/or in centimeters), a display resolution for the user device, a high-definition (HD) capability, and/or a color format (e.g., a red green blue (RGB) format or a YCbCr format (where Y represents the brightness or luma, Cb represents blue minus luma (B-Y), and Cr represents red minus luma (R-Y)), among other examples. Additionally, or alternatively, the capability indication may be associated with a haptic capability of the user device. Accordingly, the capability indication may include a number of haptic motors, a type of haptic motor (e.g., an eccentric rotating mass (ERM) actuator or a piezoelectric actuator), and/or a set of speeds available for the haptic motor, among other examples. Additionally, or alternatively, the capability indication may be associated with an audio capability of the user device. Accordingly, the capability indication may include a number of speakers, a number of channels (e.g., a stereo configuration, a 5.1 surround configuration, or a 7.1 surround configuration, among other examples), a type of speakers (e.g., ear buds, over-the-ear headset, built-in speakers for a monitor or television, an external sound bar, an external surround sound system, or a vehicle speaker system, among other examples), and/or a polyphony of a sound card of the user device, among other examples.

In some implementations, the user device may include the capability indication in a same message with the request described in connection with reference number 110. For example, the capability indication may be included as an argument to the API call that functions as the request for the metaverse content. In another example, the capability indication may be included in a header or a body of the HTTP message that is the request for the metaverse content. Alternatively, the user device may transmit the capability indication separately from the request described in connection with reference number 110. For example, the remote service may transmit (and the user device may receive) a request for capability information in response to the request for the metaverse content, such that the user device may transmit (and the remote service may receive) the capability indication in response to the request for capability information. In another example, the user device may transmit the capability indication in a follow-on message after the request for the metaverse content.

As shown by reference number 120, the user device may additionally transmit, and the remote service may receive, a preference (e.g., at least one preference) associated with the user. For example, the preference may include a data structure based on an input from the user. For example, the user may interact with a UI generated by software executed by the user device (e.g., an OS or an application supported by the OS) such that the input includes a signal generated by the interaction. In another example, the user may speak a voice command into the user device such that the input includes a signal generated by audio.

In some implementations, the preference may expressly indicate a setting (e.g., at least one setting) associated with the user (e.g., an environmental awareness, a location, a disability, a set of collaborators, a privacy preference, or a battery preference, among other examples). Additionally, or alternatively, the preference may indicate a username, an account number, and/or another type of indicator associated with the user. Accordingly, the remote service may use a database (stored on a local memory of the remote service or stored at least partially external to the remote service, whether virtually, logically, and/or physically) to lookup the preference using a query with the indicator associated with the user.

As an example, the preference may be associated with an environmental awareness of the user. Accordingly, the preference may include an indication of electricity awareness and/or an indication of raw material awareness, among other examples. Additionally, or alternatively, the preference may be associated with a location of the user. Accordingly, the preference may include coordinates associated with the user (e.g., determined via a global navigation satellite system (GNSS)) and/or an address associated with the user (e.g., a home address input by the user), among other examples. Additionally, or alternatively, the preference may be associated with a disability of the user. Accordingly, the preference may indicate a level of visual impairment of the user and/or a level of auditory impairment of the user, among other examples. Additionally, or alternatively, the preference may be associated with a collaborator (e.g., one or more collaborators) associated with the user. Accordingly, the preference may include a username, an email address, and/or another type of indicator associated with the collaborator. Additionally, or alternatively, the preference may be associated with a privacy preference of the user. Accordingly, the preference may include categories of data that the user is willing to share with the remote service and/or categories of data that the user is willing to share with third parties, among other examples. Additionally, or alternatively, the preference may be associated with a battery preference of the user. Accordingly, the preference may indicate a battery optimization mode selected by the user and/or a threshold associated with the battery optimization mode, among other examples.

In some implementations, the user device may include the preference in a same message with the request described in connection with reference number 110. For example, the preference may be included as an argument to the API call that functions as the request for the metaverse content. In another example, the preference may be included in a header or a body of the HTTP message that is the request for the metaverse content. Alternatively, the user device may transmit the preference separately from the request described in connection with reference number 110. For example, the remote service may transmit (and the user device may receive) a request for user preferences in response to the request for the metaverse content, such that the user device may transmit (and the remote service may receive) the preference in response to the request for user preferences. In another example, the user device may transmit the preference in a follow-on message after the request for the metaverse content. The preference may be transmitted separately from the capability indication or together with the capability indication (e.g., in a same follow-on message).

As shown by reference number 125, the remote service may select a format for the metaverse content. The format may be associated with a visual presentation of the metaverse content. For example, the format of the metaverse content may include a level-of-detail (LoD) associated with images (e.g., one or more images) included in the metaverse content, as described in connection with FIG. 6. Additionally, or alternatively, the format of the metaverse content may include a level of content, external to a current point-of-view (PoV), included in the metaverse content, as described in connection with FIG. 5. The format may additionally or alternatively be associated with an auditory presentation of the metaverse content. For example, the format of the metaverse content may include a number of channels associated with audio included in the metaverse content. Additionally, or alternatively, the format of the metaverse content may include an amount of accessible text included in the metaverse content, as described in connection with FIG. 5. The format may additionally or alternatively be associated with supplemental output included in the metaverse content. For example, the format of the metaverse content may include an amount of tactile feedback included in the metaverse content. The format may additionally or alternatively be associated with interaction with the metaverse content. For example, the format of the metaverse content may include a selection between voice prompts and tactile inputs associated with the metaverse content. Additionally, or alternatively, the format of the metaverse content may include prompts configured for a specific input component, such as a touchscreen or a joystick, among other examples.

The remote service may select the format based on the capability indication and the preference. In some implementations, the remote service may select the format using a set of rules. For example, a rule may indicate an LoD and/or a number of audio channels to select based on a charged percentage for the battery of the user device (e.g., a higher LoD and/or more audio channels when the percentage satisfies a threshold, but a lower LoD and/or fewer audio channels when the percentage fails to satisfy the threshold). In another example, a rule may indicate an LoD and/or a number of audio channels to select based on a charging status of the battery (e.g., a higher LoD and/or more audio channels when the user device is charging, as compared to when the user device is not charging). In another example, a rule may indicate an LoD and/or a number of audio channels to select based on a maximum or average clock speed (e.g., a higher LoD and/or more audio channels when the clock speed satisfies a threshold, but a lower LoD and/or fewer audio channels when the clock speed fails to satisfy the threshold). In another example, a rule may indicate an LoD to select based on whether the user device has a dedicated graphics processing unit (GPU) (e.g., a higher LoD when the user device has a GPU, compared to when the user device lacks a GPU). In another example, a rule may indicate an LoD and/or a number of audio channels to select based on a download speed and/or a connection type of the user device (e.g., a higher LoD and/or more audio channels when the connection is wired and/or the download speed satisfies a threshold, but a lower LoD and/or fewer audio channels when the connection is wireless and/or the download speed fails to satisfy the threshold). In another example, a rule may indicate a level of content, external to a current PoV, based on a screen size of the user device (e.g., a higher level of content when the screen size is larger, as compared with when the screen size is smaller). In another example, a rule may indicate an amount of tactile feedback based on a number of haptic motors and/or a set of speeds available for the haptic motors of the user device (e.g., more tactile feedback when the user device has more haptic motors and/or more speeds available, as compared with fewer motors and/or fewer speeds). In another example, a rule may indicate a number of audio channels to select based on a number of speakers and/or a type of speakers of the user device (e.g., more audio channels when the user device has more speakers and/or larger speakers, as compared with fewer speakers and/or smaller speakers).

In another example, a rule may indicate an LoD and/or a number of audio channels to select based on a level of electricity awareness of the user (e.g., a higher LoD and/or more audio channels when the level of electricity awareness is lower, as compared with higher electricity awareness). In another example, a rule may indicate an LoD to select based on coordinates associated with the user (e.g., a higher LoD when the user appears to be jogging or driving, as compared with the user walking or being stationary). In another example, a rule may indicate an amount of accessible text included in the metaverse content based on a level of auditory impairment of the user (e.g., more detailed accessible text when the level of auditory impairment is higher). In another example, a rule may indicate to use voice prompts based on a level of visual impairment of the user (e.g., when the level of visual impairment satisfies a threshold). In another example, a rule may indicate an LoD and/or a number of audio channels to select based on a battery preference of the user (e.g., a higher LoD and/or more audio channels when the battery preference is associated with performance over longevity).

The set of rules may be applied sequentially (e.g., when related to a same portion of the metaverse content) or in parallel (e.g., when related to different portions of the metaverse content). Additionally, or alternatively, the remote service may calculate a score from the capability indication and the preference and select the format using the score. For example, the remote service may calculate a performance score based on hardware capabilities of the user device and preferences of the user to determine an LoD and a number of audio channels to select based on the performance score. In another example, the remote service may calculate a network score based on connection properties of the user device and preferences of the user to determine an amount of alternative text, a number of audio channels, and/or a level of content (external to a current PoV) to select based on the network score.

As shown in FIG. 1C and by reference number 130, the remote service may encode the metaverse content into packets (e.g., one or more packets). Accordingly, as shown by reference number 135, the remote service may transmit, and the user device may receive, the packets encoding the metaverse content. The metaverse content is encoded according to the selected format.

As shown by reference number 140, the user device may decode the packets. As shown by reference number 145, the user device may deliver the metaverse content to the user (e.g., using an output component, such as a display, a haptic motor, a speaker, or another type of output component). For example, the user device may use a driver, associated with the output component, to translate the decoded packets into hardware-level signals for delivery to the user.

By using techniques as described in connection with FIGS. 1A-1C, the remote service selects the format for the metaverse content based on the capability indication. As a result, power is conserved (e.g., when the user device is a battery-powered device), dropped packets are reduced (e.g., when the user device is a wireless device or another type of device with smaller throughput), and/or processing resources are conserved (e.g., by refraining from providing packets associated with capabilities that the user device lacks, such as additional audio channels, high-resolution images, and/or haptic feedback). Additionally, the remote service further selects the format for the metaverse content based on the preference. As a result, power is conserved (e.g., for users with environmental awareness or conservative battery settings), and/or processing resources are conserved (e.g., by refraining from providing packets that would not be helpful due to the user's impairments, such as packets encoding additional audio channels, packets encoding high-resolution images, and/or packets encoding alternative text).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

FIGS. 2A-2E are diagrams of an example implementation 200 associated with continuing metaverse content across different devices. As shown in FIGS. 2A-2E, example implementation 200 includes a first user device, a second user device, and a remote service. These devices are described in more detail below in connection with FIG. 7 and FIG. 8.

Figure 2A:
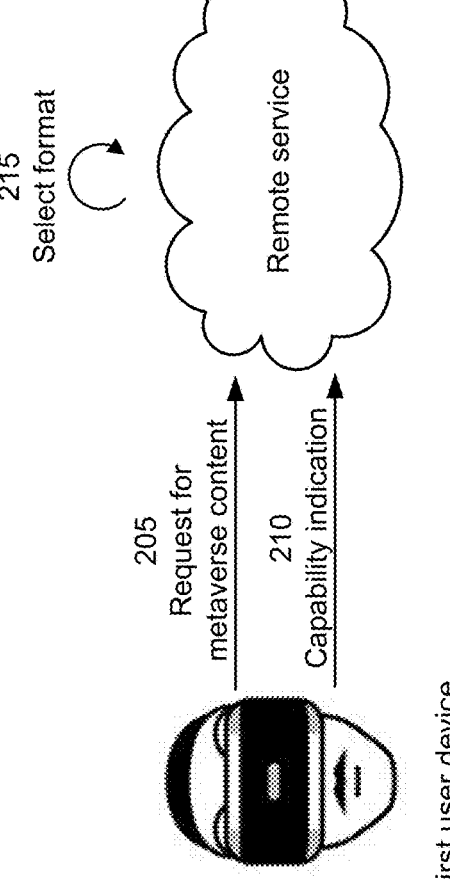
FIGS. 2A-2E are diagrams of an example implementation described herein.

As shown in FIG. 2A and by reference number 205, the first user device may transmit, and the remote service may receive, a request for metaverse content. A user of the first user device may trigger the request, as described in connection with reference number 105 of FIG. 1A. The request may be included in an HTTP message transmitted to the remote service. Additionally, or alternatively, the first user device may perform a call to an API function provided by the remote service such that the API call is the request. The request may include an indication of the metaverse content, such as a URL associated with the metaverse content, an IP address associated with the metaverse content, a title (or another type of string indicator) associated with the metaverse content, and/or an index (or another type of alphanumeric identifier) associated with the metaverse content, among other examples.

Additionally, as shown by reference number 210, the first user device may additionally transmit, and the remote service may receive, a capability indication (e.g., at least one capability indication) associated with the first user device. For example, the capability indication may include a data structure as described in connection with FIG. 3. In some implementations, the capability indication may expressly indicate a property (e.g., at least one property) of the first user device (e.g., a battery level, a computing power, a connection status, a screen size, a haptic capability, or an audio capability, among other examples). Additionally, or alternatively, the capability indication may indicate a model number, a serial number, and/or another type of indicator associated with the first user device. Accordingly, the remote service may use a database (stored on a local memory of the remote service or stored at least partially external to the remote service, whether virtually, logically, and/or physically) to lookup the property of the first user device using a query with the indicator associated with the first user device.

The capability indication may be as described in connection with reference number 115 of FIG. 1B. In some implementations, the first user device may include the capability indication in a same message with the request described in connection with reference number 205. For example, the capability indication may be included as an argument to the API call that functions as the request for the metaverse content. In another example, the capability indication may be included in a header or a body of the HTTP message that is the request for the metaverse content. Alternatively, the first user device may transmit the capability indication separately from the request described in connection with reference number 205. For example, the remote service may transmit (and the first user device may receive) a request for capability information in response to the request for the metaverse content, such that the first user device may transmit (and the remote service may receive) the capability indication in response to the request for capability information. In another example, the first user device may transmit the capability indication in a follow-on message after the request for the metaverse content.

In some implementations, the first user device may additionally transmit, and the remote service may receive, a preference (e.g., at least one preference) associated with the user. The preference may be as described in connection with reference number 120 of FIG. 1B. In some implementations, the first user device may include the preference in a same message with the request described in connection with reference number 205. For example, the preference may be included as an argument to the API call that functions as the request for the metaverse content. In another example, the preference may be included in a header or a body of the HTTP message that is the request for the metaverse content. Alternatively, the first user device may transmit the preference separately from the request described in connection with reference number 205. For example, the remote service may transmit (and the first user device may receive) a request for user preferences in response to the request for the metaverse content, such that the first user device may transmit (and the remote service may receive) the preference in response to the request for user preferences. In another example, the first user device may transmit the preference in a follow-on message after the request for the metaverse content. The preference may be transmitted separately from the capability indication or together with the capability indication (e.g., in a same follow-on message).

As shown by reference number 215, the remote service may select a first format for the metaverse content. The first format may be as described in connection with reference number 125 of FIG. 1B. The remote service may select the first format based on the capability indication from the first user device. In implementations where the first user device additionally transmits the preference associated with the user, the remote service may select the first format based on the preference. In some implementations, the remote service may select the first format using a set of rules (e.g., as described in connection with reference number 125 of FIG. 1B). Additionally, or alternatively, the remote service may calculate a score from the capability indication (and, in implementations where the first user device additionally transmits the preference, the preference) and select the first format using the score (e.g., as described in connection with reference number 125 of FIG. 1B).

Figure 2B:
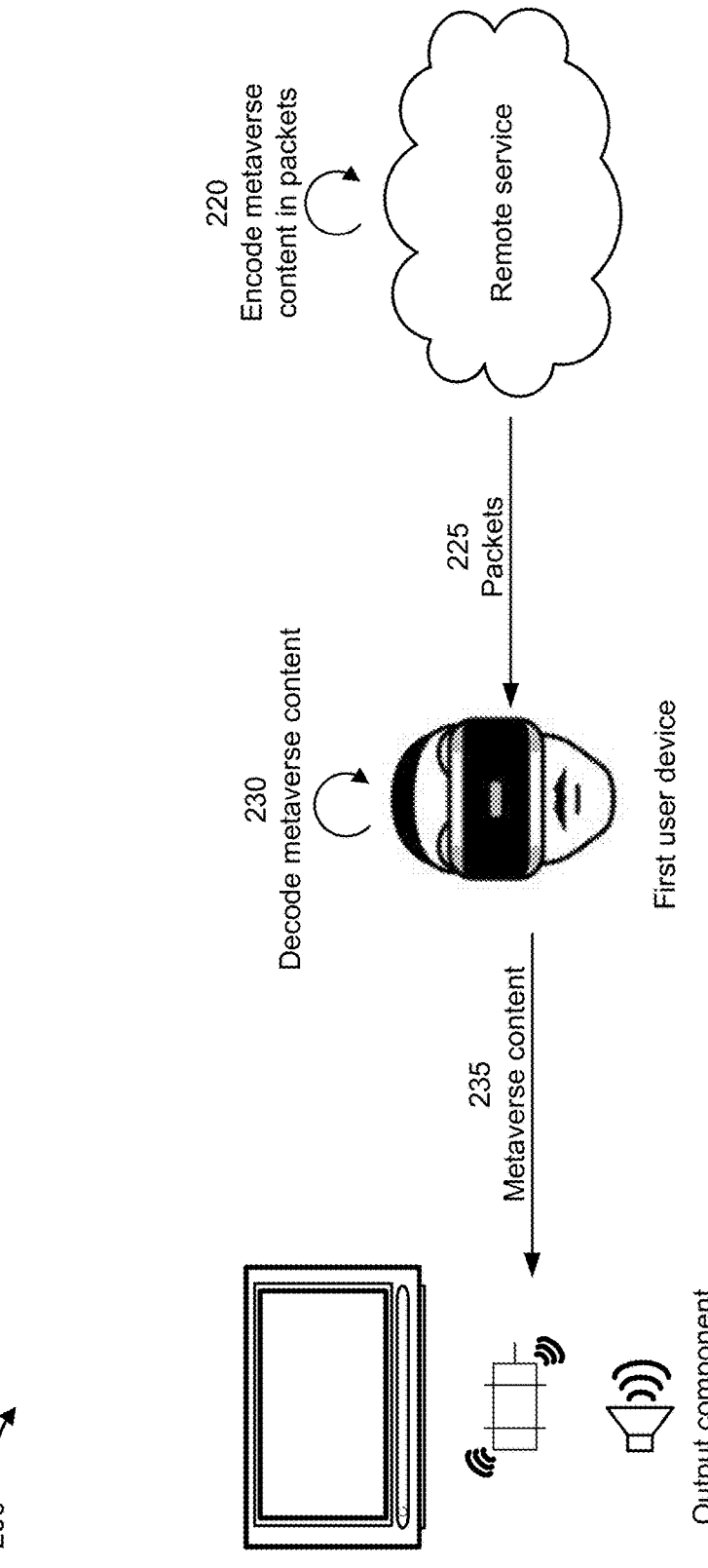

As shown in FIG. 2B and by reference number 220, the remote service may encode the metaverse content into packets (e.g., one or more packets). Accordingly, as shown by reference number 225, the remote service may transmit, and the first user device may receive, the packets encoding the metaverse content. The metaverse content is encoded according to the first format.

As shown by reference number 230, the first user device may decode the packets. As shown by reference number 235, the first user device may deliver the metaverse content to the user (e.g., using an output component, such as a display, a haptic motor, a speaker, or another type of output component). For example, the first user device may use a driver, associated with the output component, to translate the decoded packets into hardware-level signals for delivery to the user.

Figure 2C:
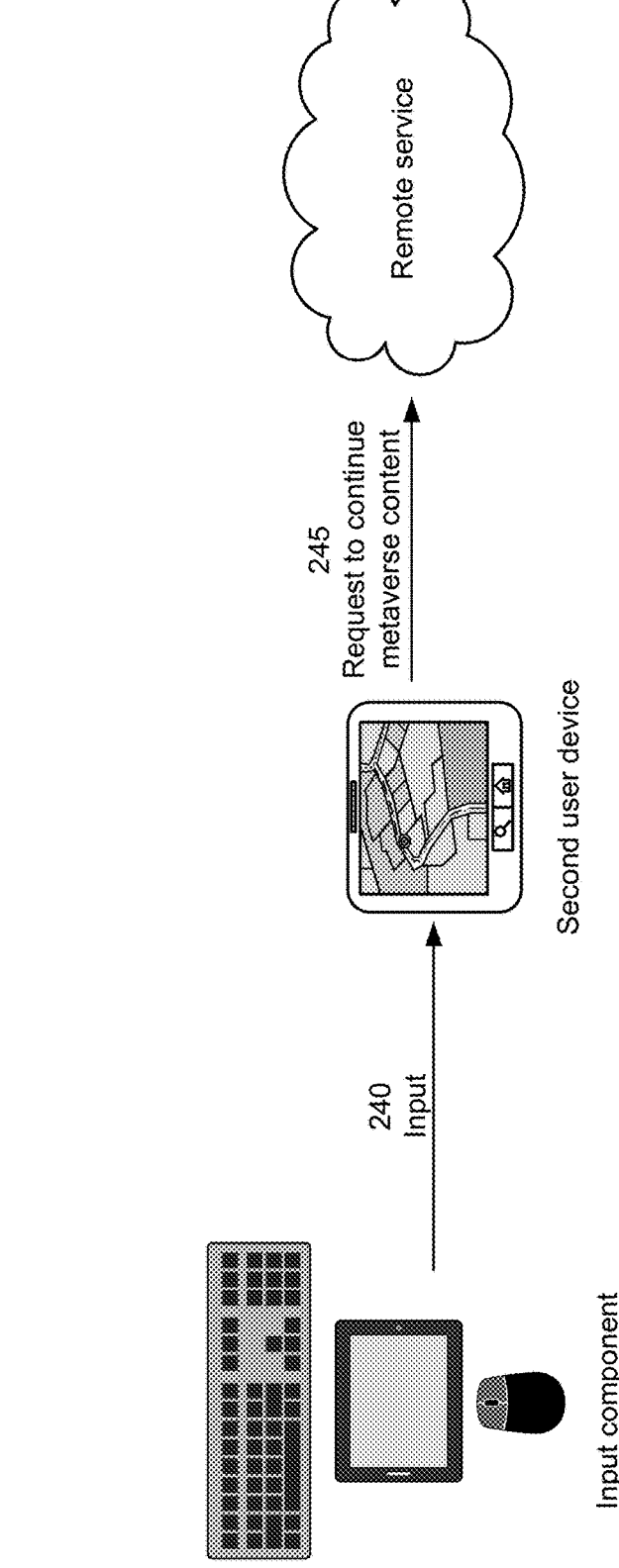

As shown in FIG. 2C and by reference number 240, the second user device may receive (e.g., using an input component, such as a keyboard, a mouse, a touchscreen, a microphone, or another type of input component) input that indicates the metaverse content. For example, the user may switch from the first user device to the second user device and may interact with a UI generated by software executed by the second user device (e.g., an OS or an application supported by the OS) such that the input includes a signal generated by the interaction. In another example, the user may speak a voice command into the second user device such that the input includes a signal generated by audio.

The input may indicate the metaverse content with a URL, an IP address, or another indication of the metaverse content relative to a network. For example, the user may interact with a web browser (or another type of application executed by the second user device) to input the URL or the IP address. Additionally, or alternatively, the input may indicate a selection of the metaverse content from a plurality of possible options. For example, the user may interact with a menu (whether visual or auditory) to input the selection.

As shown by reference number 245, the second user device may transmit, and the remote service may receive, a request to continue the metaverse content. The request may be included in an HTTP message transmitted to the remote service. Additionally, or alternatively, the second user device may perform a call to an API function provided by the remote service such that the API call is the request. The request may include an indication of the metaverse content, such as a URL associated with the metaverse content, an IP address associated with the metaverse content, a title (or another type of string indicator) associated with the metaverse content, and/or an index (or another type of alphanumeric identifier) associated with the metaverse content, among other examples.

In some implementations, the user may input a set of credentials (e.g., a username, password, a passcode, biometric information, and/or a secret answer, among other examples) into the second user device (e.g., as described in connection with reference number 240). Accordingly, the second user device may transmit, and the remote service may receive, the set of credentials. Accordingly, the remote service may determine to continue the metaverse content that was previously being delivered to the first user device. For example, the remote service may determine that the set of credentials is associated with a same user (and/or account) as was associated with the first user device (and/or with the metaverse content being delivered).

Figure 2D:
Figure 2D:
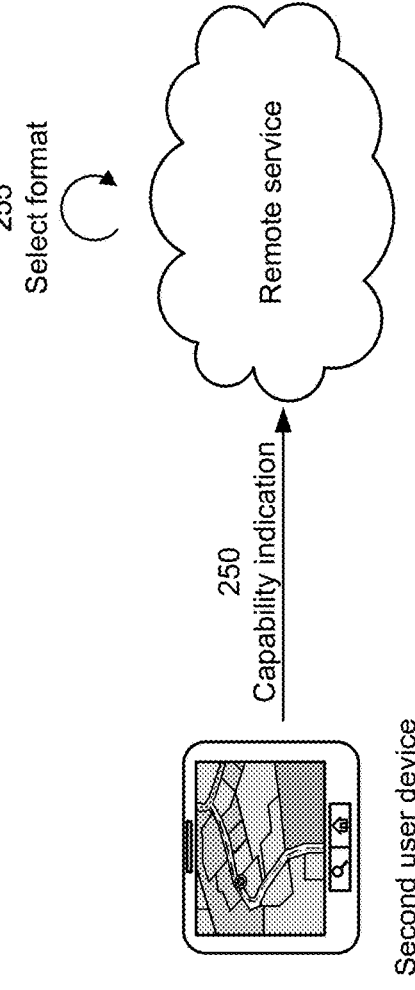

As shown in FIG. 2D and by reference number 250, a capability indication (e.g., at least one capability indication) associated with the second user device. For example, the capability indication may include a data structure as described in connection with FIG. 3. In some implementations, the capability indication may expressly indicate a property (e.g., at least one property) of the second user device (e.g., a battery level, a computing power, a connection status, a screen size, a haptic capability, or an audio capability, among other examples). Additionally, or alternatively, the capability indication may indicate a model number, a serial number, and/or another type of indicator associated with the second user device. Accordingly, the remote service may use a database (stored on a local memory of the remote service or stored at least partially external to the remote service, whether virtually, logically, and/or physically) to lookup the property of the second user device using a query with the indicator associated with the second user device.

The capability indication may be as described in connection with reference number 115 of FIG. 1B. In some implementations, the second user device may include the capability indication in a same message with the request described in connection with reference number 245. For example, the capability indication may be included as an argument to the API call that functions as the request for the metaverse content. In another example, the capability indication may be included in a header or a body of the HTTP message that is the request for the metaverse content. Alternatively, the second user device may transmit the capability indication separately from the request described in connection with reference number 245. For example, the remote service may transmit (and the second user device may receive) a request for capability information in response to the request for the metaverse content, such that the second user device may transmit (and the remote service may receive) the capability indication in response to the request for capability information. In another example, the second user device may transmit the capability indication in a follow-on message after the request for the metaverse content.

In some implementations, the second user device may additionally transmit, and the remote service may receive, a preference (e.g., at least one preference) associated with the user. The preference may be as described in connection with reference number 120 of FIG. 1B. In some implementations, the second user device may include the preference in a same message with the request described in connection with reference number 245. For example, the preference may be included as an argument to the API call that functions as the request for the metaverse content. In another example, the preference may be included in a header or a body of the HTTP message that is the request for the metaverse content. Alternatively, the second user device may transmit the preference separately from the request described in connection with reference number 245. For example, the remote service may transmit (and the first user device may receive) a request for user preferences in response to the request for the metaverse content such that the second user device may transmit (and the remote service may receive) the preference in response to the request for user preferences. In another example, the second user device may transmit the preference in a follow-on message after the request for the metaverse content. The preference may be transmitted separately from the capability indication or together with the capability indication (e.g., in a same follow-on message).

As shown by reference number 255, the remote service may select a second format for the metaverse content. The first format may be as described in connection with reference number 125 of FIG. 1B. The remote service may select the second format based on the capability indication from the second user device. For example, the second user device may have different capabilities as compared with the first user device, such as a smaller screen, additional speakers, more battery capacity, a different connection type, and/or another capability difference. Therefore, the remote service may determine a difference (e.g., at least one difference) between the first user device and the second user device based on the capability indication from the first user device and the capability indication from the second user device, and the remote service may select the second format based on the first format and based on the difference between the first user device and the second user device. For example, the remote service may begin with the first format and modify an LoD, a number of audio channels, an input technique (e.g., from visual prompts to voice commands), and/or an amount of alternative text, among other examples, to determine the second format, based on the difference between the second user device and the first user device.

In implementations where the second user device additionally transmits the preference associated with the user, the remote service may select the second format based on the preference. For example, the user may have different preferences associated with the second user device as compared with the first user device. Additionally, or alternatively, the remote service may store multiple preferences (e.g., on a local memory of the remote service or on a memory at least partially external to the remote service, whether virtually, logically, and/or physically) and associate different preferences with identifiers of different user devices. Accordingly, the remote service may retrieve the preference to apply for the second user device (e.g., using a query with an identifier of the second user device).

In some implementations, the remote service may select the second format using a set of rules (e.g., as described in connection with reference number 125 of FIG. 1B). Additionally, or alternatively, the remote service may calculate a score from the capability indication (and, in implementations where the second user device additionally transmits the preference, the preference) and select the second format using the score (e.g., as described in connection with reference number 125 of FIG. 1B).

Figure 2E:
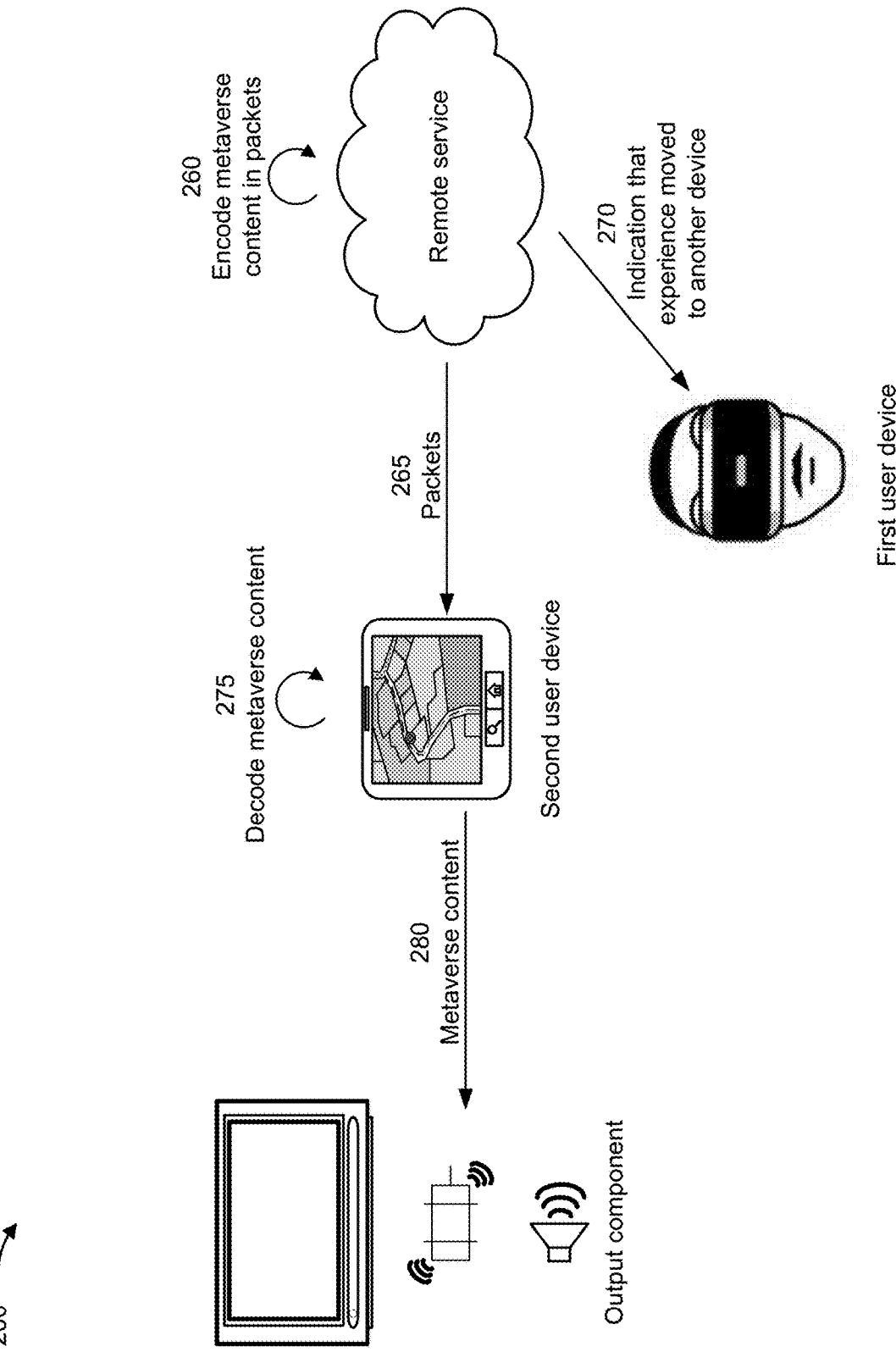

As shown in FIG. 2E and by reference number 260, the remote service may encode the metaverse content into packets (e.g., one or more packets). Accordingly, as shown by reference number 265, the remote service may transmit, and the second user device may receive, the packets encoding the metaverse content. The metaverse content is encoded according to the second format.

In some implementations, as shown by reference number 270, the remote service may transmit, and the first user device may receive, an indication that the metaverse content moved to another device. For example, the remote service may transmit an indication that the metaverse content is continuing on the second user device. Accordingly, the first user device may display, play, or otherwise deliver the indication to the user.

As shown by reference number 275, the second user device may decode the packets. As shown by reference number 280, the second user device may deliver the metaverse content to the user (e.g., using an output component, such as a display, a haptic motor, a speaker, or another type of output component). For example, the second user device may use a driver, associated with the output component, to translate the decoded packets into hardware-level signals for delivery to the user.

By using techniques as described in connection with FIGS. 2A-2E, the remote service continues the metaverse content on the second user device from the first user device. As a result, the remote service conserves power and processing resources that otherwise would have been consumed in terminating the metaverse content on the first user device and restarting the metaverse content on the second user device. Additionally, the remote service customizes the metaverse content to both the first user device and the second user device. As a result, power is conserved for some devices, dropped packets are reduced for some devices, and processing resources are conserved for some devices (e.g., as described in connection with FIGS. 1A-1C).

As indicated above, FIGS. 2A-2E are provided as an example. Other examples may differ from what is described with regard to FIGS. 2A-2E. The number and arrangement of devices shown in FIGS. 2A-2E are provided as an example. In practice, there may be additional devices, fewer devices, different devices, or differently arranged devices than those shown in FIGS. 2A-2E. Furthermore, two or more devices shown in FIGS. 2A-2E may be implemented within a single device, or a single device shown in FIGS. 2A-2E may be implemented as multiple, distributed devices. Additionally, or alternatively, a set of devices (e.g., one or more devices) shown in FIGS. 2A-2E may perform one or more functions described as being performed by another set of devices shown in FIGS. 2A-2E.

Figure 3:
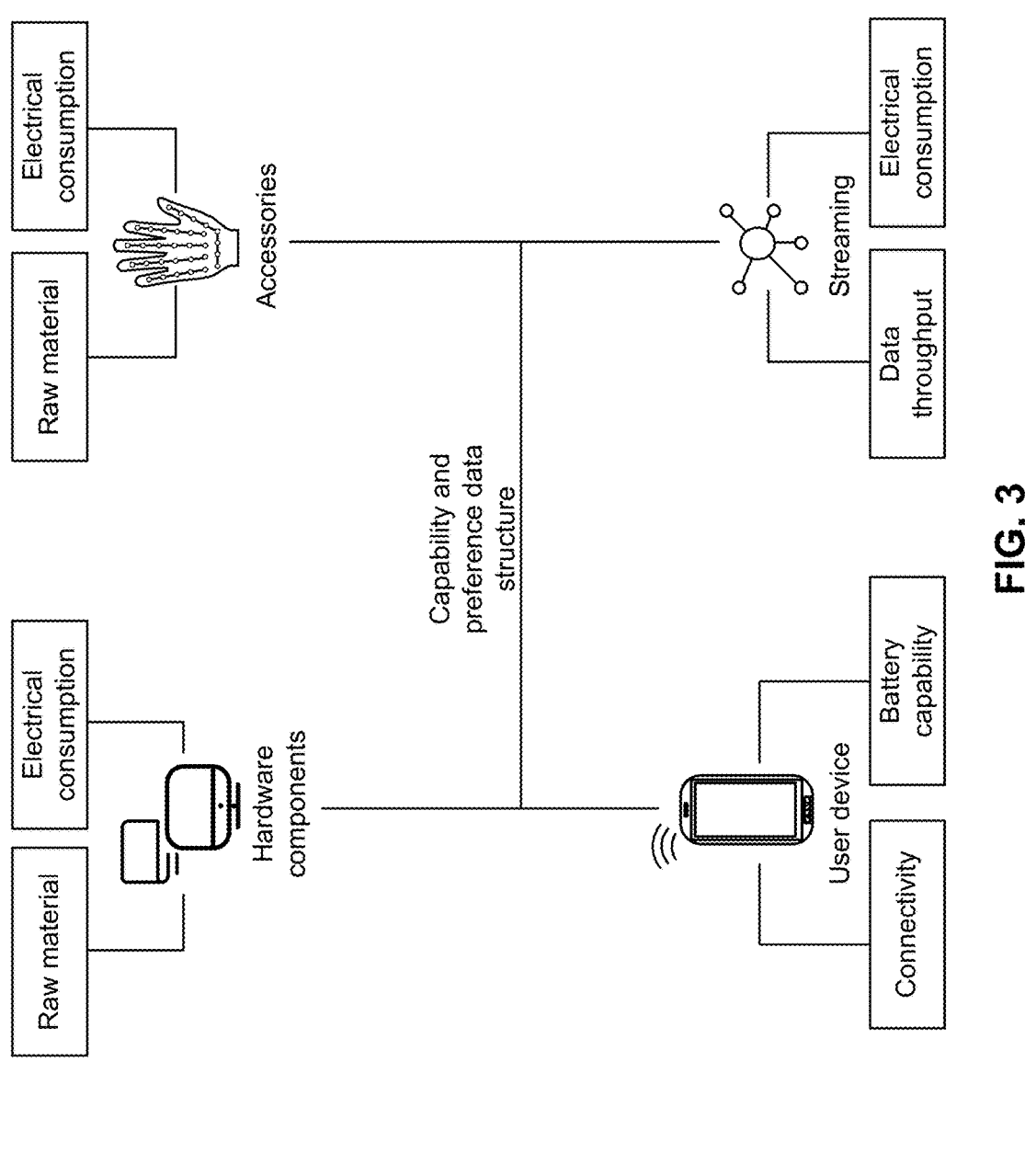
FIG. 3 is a diagram of an example implementation associated with capability indications and user preferences.

FIG. 3 is a diagram of an example implementation 300 associated with capability indications and user preferences. As shown in FIG. 3, example implementation 300 includes a data structure that encodes capability indications and user preferences. The data structure may be received by a remote service (e.g., as described in connection with FIGS. 1A-1C and FIGS. 2A-2E) or may be generated by the remote service (e.g., based on capability indications and preferences from a user device, as described in connection with FIGS. 1A-1C and FIGS. 2A-2E).

As shown in FIG. 3, the data structure may be organized as a tree (or a graph or another similar type of structure) by category. Accordingly, in the example implementation 300, preferences regarding raw material awareness and preferences regarding electrical consumption awareness may be organized by streaming usage, accessory usage, and hardware component usage. Additionally, in the example implementation 300, capability indications for the user device include a connectivity indication and a battery capability.

As indicated above, FIG. 3 is provided as an example. Other examples may differ from what is described with regard to FIG. 3. For example, additional preferences described herein may be included in the data structure. Additionally, or alternatively, additional capability indications described herein may be included in the data structure.

Figure 4:
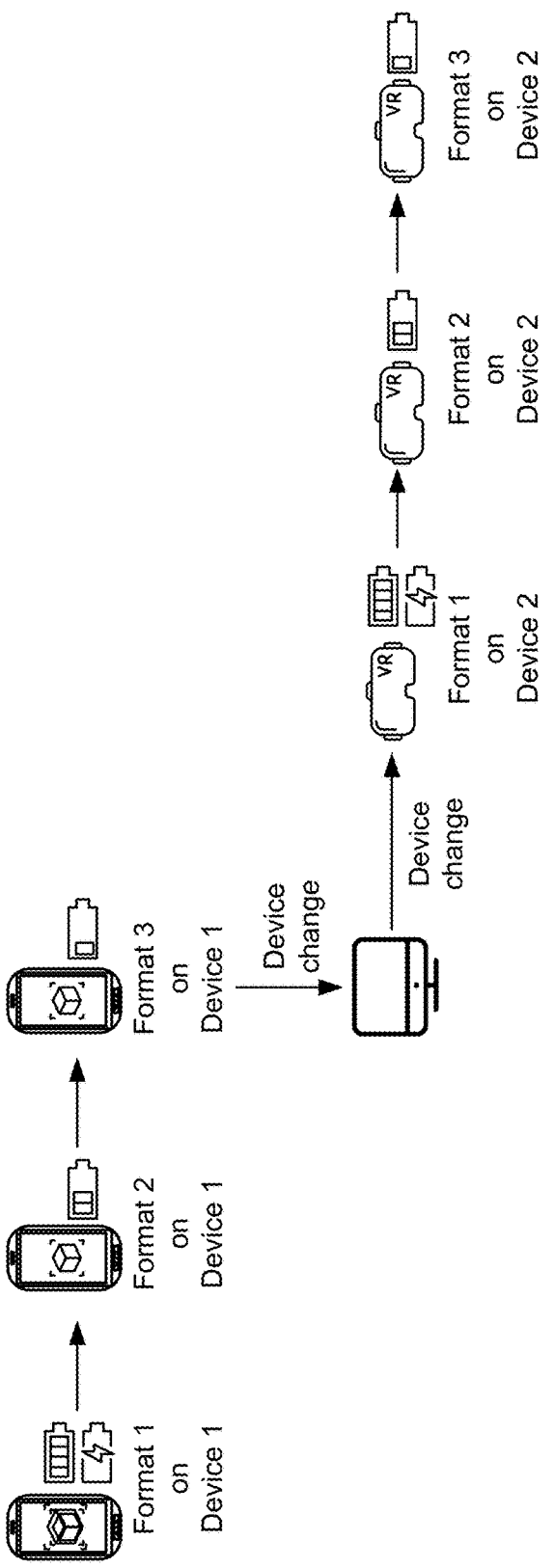
FIG. 4 is a diagram of an example implementation associated with migrating a metaverse experience across devices.

FIG. 4 is a diagram of an example implementation 400 associated with migrating a metaverse experience across devices. As shown in FIG. 4, example implementation 400 includes metaverse content delivered to a first device (shown as "Device 1"). A remote service may deliver the metaverse content according to a first format (shown as "Format 1") based on a capability indication (e.g., a fully charged battery and/or an active charging status, as shown in FIG. 4).

As further shown in FIG. 4, the remote service may deliver the metaverse content according to a second format (shown as "Format 2") based on the capability indication changing (e.g., a battery percentage that satisfies a threshold associated with Format 2 and/or an inactive charging status, as shown in FIG. 4). Similarly, the remote service may deliver the metaverse content according to a third format (shown as "Format 3") based on the capability indication changing (e.g., a battery percentage that fails to satisfy the threshold associated with Format 2, as shown in FIG. 4).

Accordingly, the user may migrate to a second device (shown as "Device 2"). In the example implementation 400, the user uses a transition device to instruct the remote service to continue the metaverse content on the second device. Alternatively, the user may log into the second device, and the remote service may determine to continue the metaverse content automatically.

As shown in FIG. 4, for the second device, the remote service may deliver the metaverse content according to the first format based on a capability indication (e.g., a fully charged battery and/or an active charging status, as shown in FIG. 4). As further shown in FIG. 4, the remote service may deliver the metaverse content according to the second format based on the capability indication changing (e.g., a battery percentage that satisfies a threshold associated with Format 2 and/or an inactive charging status, as shown in FIG. 4). Similarly, the remote service may deliver the metaverse content according to the third format based on the capability indication changing (e.g., a battery percentage that fails to satisfy the threshold associated with Format 2, as shown in FIG. 4). Although the formats for the first device and the second device are the same in the example implementation 400, other example implementations may use different formats based on different hardware available on the second device as compared with the first device.

As indicated above, FIG. 4 is provided as an example. Other examples may differ from what is described with regard to FIG. 4.

Figure 5:
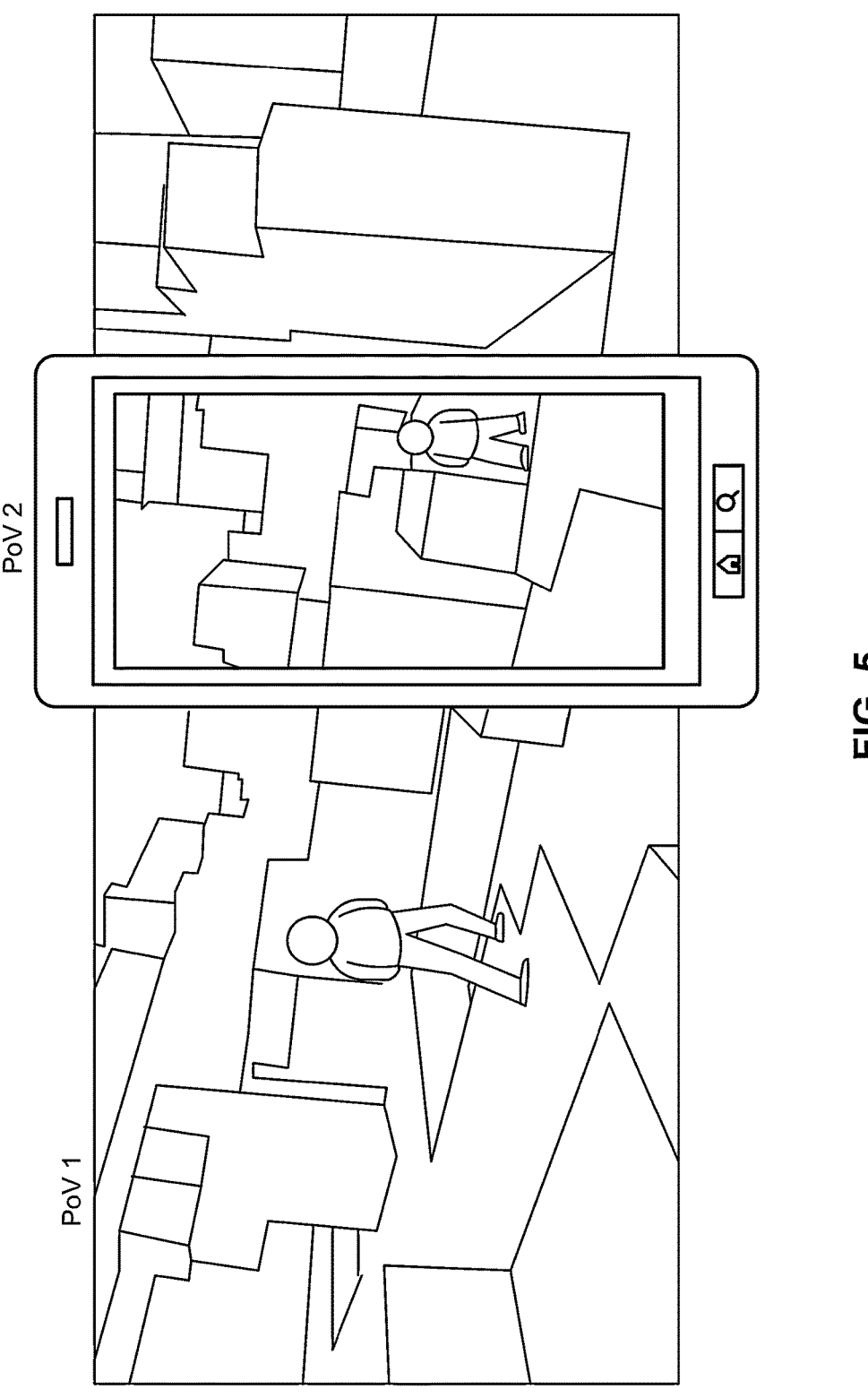
FIG. 5 is a diagram of an example implementation associated with points-of-view.

FIG. 5 is a diagram of an example implementation 500 associated with PoVs across devices. As shown in FIG. 5, example implementation 500 shows a first PoV ("PoV 1")

associated with a first device and a second PoV ("PoV 2") associated with a second device. Accordingly, when the first device is being used, a remote service may deliver visual content within PoV 1. However, when the second device is being used, the remote service may determine a level of content, external to PoV 2, to deliver to the second device. Delivering additional content reduces latency when the user navigates the metaverse content, but delivering additional content consumes additional network resources, memory overhead, processing resources, and power.

As indicated above, FIG. 5 is provided as an example. Other examples may differ from what is described with regard to FIG. 5.

Figure 6:
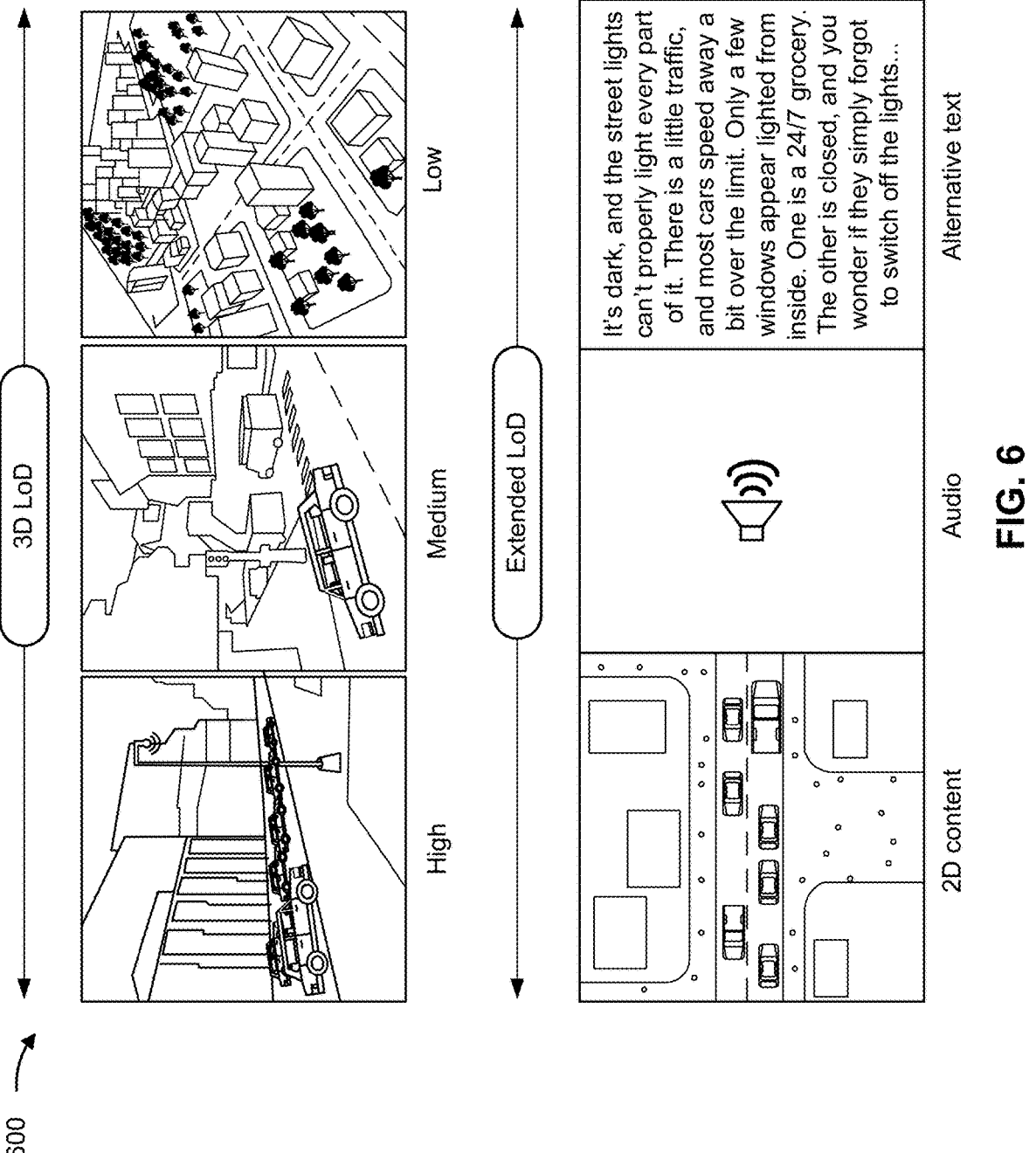
FIG. 6 is a diagram of an example implementation associated with levels-of-detail.

FIG. 6 is a diagram of an example implementation 600 associated with LoDs and supplemental content. As shown in FIG. 6, example implementation 600 shows high LoD, medium LoD, and low LoD for three-dimensional graphics. The example implementation 600 further shows an LoD for two-dimensional graphics as well as supplemental content including audio and alternative text. A remote service may select between LoDs (and supplemental content) in the example implementation 600 based on capability indications and preferences, as described in connection with FIGS. 1A-1C and FIGS. 2A-2E.

As indicated above, FIG. 6 is provided as an example. Other examples may differ from what is described with regard to FIG. 6.

Figure 7:
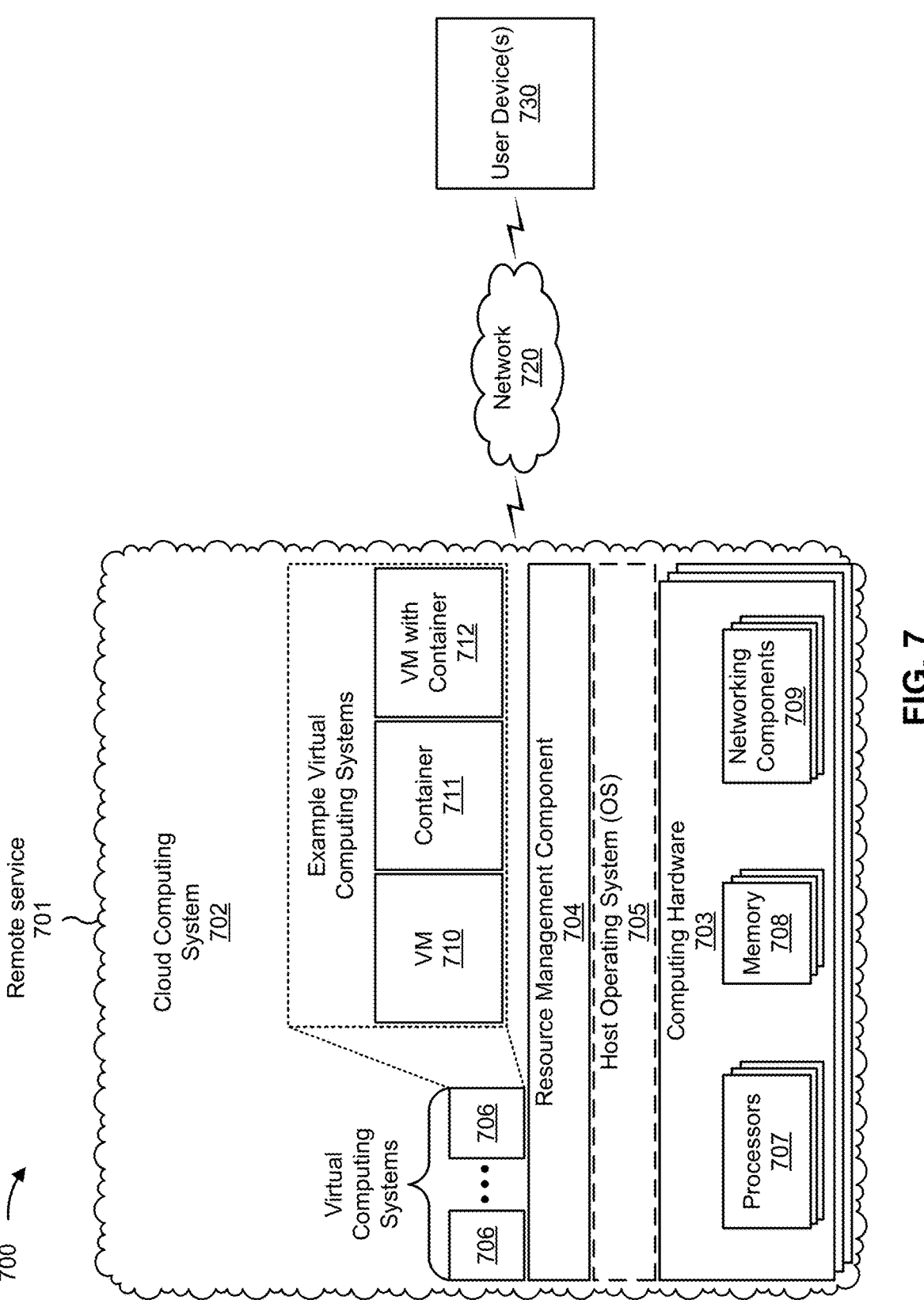
FIG. 7 is a diagram of an example environment in which systems and/or methods described herein may be implemented.

FIG. 7 is a diagram of an example environment 700 in which systems and/or methods described herein may be implemented. As shown in FIG. 7, environment 700 may include a remote service 701, which may include one or more elements of and/or may execute within a cloud computing system 702. The cloud computing system 702 may include one or more elements 703-712, as described in more detail below. As further shown in FIG. 7, environment 700 may include a network 720 and/or one or more user devices 730. Devices and/or elements of environment 700 may interconnect via wired connections and/or wireless connections.

The cloud computing system 702 may include computing hardware 703, a resource management component 704, a host OS 705, and/or one or more virtual computing systems 706. The cloud computing system 702 may execute on, for example, an Amazon Web Services platform, a Microsoft Azure platform, or a Snowflake platform. The resource management component 704 may perform virtualization (e.g., abstraction) of computing hardware 703 to create the one or more virtual computing systems 706. Using virtualization, the resource management component 704 enables a single computing device (e.g., a computer or a server) to operate like multiple computing devices, such as by creating multiple isolated virtual computing systems 706 from computing hardware 703 of the single computing device. In this way, computing hardware 703 can operate more efficiently, with lower power consumption, higher reliability, higher availability, higher utilization, greater flexibility, and lower cost than using separate computing devices.

The computing hardware 703 may include hardware and corresponding resources from one or more computing devices. For example, computing hardware 703 may include hardware from a single computing device (e.g., a single server) or from multiple computing devices (e.g., multiple servers), such as multiple computing devices in one or more data centers. As shown, computing hardware 703 may include one or more processors 707, one or more memories 708, and/or one or more networking components 709.

Examples of a processor, a memory, and a networking component (e.g., a communication component) are described elsewhere herein.

The resource management component 704 may include a virtualization application (e.g., executing on hardware, such as computing hardware 703) capable of virtualizing computing hardware 703 to start, stop, and/or manage one or more virtual computing systems 706. For example, the resource management component 704 may include a hypervisor (e.g., a bare-metal or Type 1 hypervisor, a hosted or Type 2 hypervisor, or another type of hypervisor) or a virtual machine monitor, such as when the virtual computing systems 706 are virtual machines 710. Additionally, or alternatively, the resource management component 704 may include a container manager, such as when the virtual computing systems 706 are containers 711. In some implementations, the resource management component 704 executes within and/or in coordination with a host operating system 705.

A virtual computing system 706 may include a virtual environment that enables cloud-based execution of operations and/or processes described herein using computing hardware 703. As shown, a virtual computing system 706 may include a virtual machine 710, a container 711, or a hybrid environment 712 that includes a virtual machine and a container, among other examples. A virtual computing system 706 may execute one or more applications using a file system that includes binary files, software libraries, and/or other resources required to execute applications on a guest operating system (e.g., within the virtual computing system 706) or the host operating system 705.

Although the remote service 701 may include one or more elements 703-712 of the cloud computing system 702, may execute within the cloud computing system 702, and/or may be hosted within the cloud computing system 702, in some implementations, the remote service 701 may not be cloud-based (e.g., may be implemented outside of a cloud computing system) or may be partially cloud-based. For example, the remote service 701 may include one or more devices that are not part of the cloud computing system 702, such as device 800 of FIG. 8, which may include a stand-alone server or another type of computing device. The remote service 701 may perform one or more operations and/or processes described in more detail elsewhere herein.

The network 720 may include one or more wired and/or wireless networks. For example, the network 720 may include a cellular network, a public land mobile network (PLMN), a local area network (LAN), a wide area network (WAN), a private network, the Internet, and/or a combination of these or other types of networks. The network 720 enables communication among the devices of the environment 700.

The user device(s) 730 may include one or more devices capable of receiving, generating, storing, processing, and/or providing information associated with metaverse content, as described elsewhere herein. The user device 730 may include a communication device and/or a computing device. For example, the user device 730 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of the environment 700 may perform one or more functions described as being performed by another set of devices of the environment 700.

Figure 8:
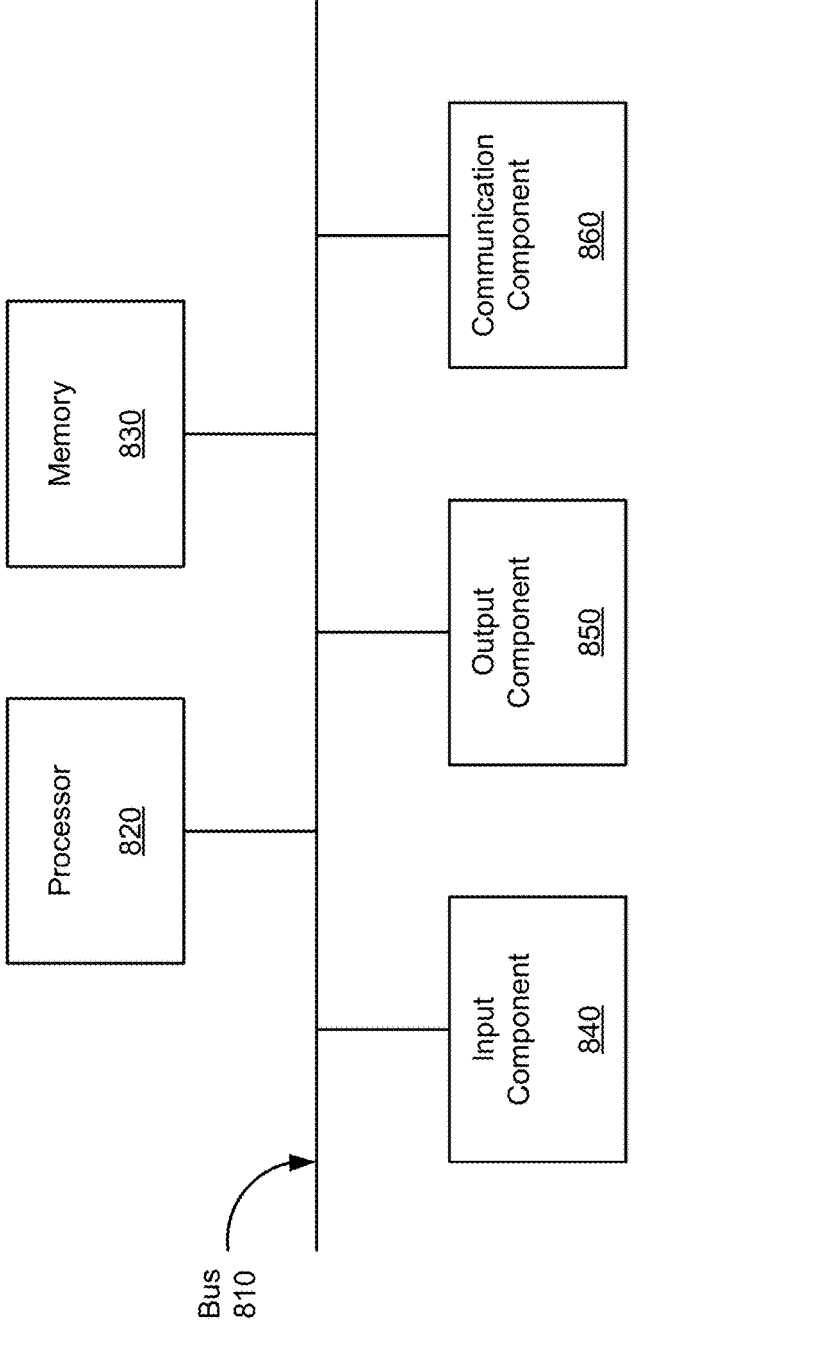
FIG. 8 is a diagram of example components of one or more devices of FIG. 7.

FIG. 8 is a diagram of example components of a device 800 associated with device-specific metaverse content. The device 800 may correspond to the user device(s) 730. In some implementations, the user device(s) 730 may include one or more devices 800 and/or one or more components of the device 800. As shown in FIG. 8, the device 800 may include a bus 810, a processor 820, a memory 830, an input component 840, an output component 850, and/or a communication component 860.

The bus 810 may include one or more components that enable wired and/or wireless communication among the components of the device 800. The bus 810 may couple together two or more components of FIG. 8, such as via operative coupling, communicative coupling, electronic coupling, and/or electric coupling. For example, the bus 810 may include an electrical connection (e.g., a wire, a trace, and/or a lead) and/or a wireless bus. The processor 820 may include a central processing unit, a graphics processing unit, a microprocessor, a controller, a microcontroller, a digital signal processor, a field-programmable gate array, an application-specific integrated circuit, and/or another type of processing component. The processor 820 may be implemented in hardware, firmware, or a combination of hardware and software. In some implementations, the processor 820 may include one or more processors capable of being programmed to perform one or more operations or processes described elsewhere herein.

The memory 830 may include volatile and/or nonvolatile memory. For example, the memory 830 may include random access memory (RAM), read only memory (ROM), a hard disk drive, and/or another type of memory (e.g., a flash memory, a magnetic memory, and/or an optical memory). The memory 830 may include internal memory (e.g., RAM, ROM, or a hard disk drive) and/or removable memory (e.g., removable via a universal serial bus connection). The memory 830 may be a non-transitory computer-readable medium. The memory 830 may store information, one or more instructions, and/or software (e.g., one or more software applications) related to the operation of the device 800. In some implementations, the memory 830 may include one or more memories that are coupled (e.g., communicatively coupled) to one or more processors (e.g., processor 820), such as via the bus 810. Communicative coupling between a processor 820 and a memory 830 may enable the processor 820 to read and/or process information stored in the memory 830 and/or to store information in the memory 830.

The input component 840 may enable the device 800 to receive input, such as user input and/or sensed input. For example, the input component 840 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 850 may enable the device 800 to provide output, such as via a display, a speaker, and/or a light-emitting diode. The communication component 860 may enable the device 800 to communicate with other devices via a wired connection and/or a wireless connection. For example, the communication component 860 may include a receiver, a transmitter, a transceiver, a modem, a network interface card, and/or an antenna.

The device 800 may perform one or more operations or processes described herein. For example, a non-transitory computer-readable medium (e.g., memory 830) may store a set of instructions (e.g., one or more instructions or code) for execution by the processor 820. The processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hardwired circuitry may be used instead of or in combination with the instructions to perform one or more operations or processes described herein. Additionally, or alternatively, the processor 820 may be configured to perform one or more operations or processes described herein. Thus, implementations described herein are not limited to any specific combination of hardware circuitry and software.

The number and arrangement of components shown in FIG. 8 are provided as an example. The device 800 may include additional components, fewer components, different components, or differently arranged components than those shown in FIG. 8. Additionally, or alternatively, a set of components (e.g., one or more components) of the device 800 may perform one or more functions described as being performed by another set of components of the device 800.

FIG. 9 is a flowchart of an example process 900 associated with device-specific metaverse content. In some implementations, one or more process blocks of FIG. 9 are performed by a user device (e.g., user device 730). In some implementations, one or more process blocks of FIG. 9 are performed by another device or a group of devices separate from or including the user device, such as a remote service (e.g., the remote service 701). Additionally, or alternatively, one or more process blocks of FIG. 9 may be performed by one or more components of device 800, such as processor 820, memory 830, input component 840, output component 850, and/or communication component 860.

As shown in FIG. 9, process 900 may include receiving input indicating metaverse content (block 910). For example, the user device may receive input indicating metaverse content, as described herein.

As further shown in FIG. 9, process 900 may include transmitting, to a remote service, a request for the metaverse content (block 920). For example, the user device may transmit, to a remote service, a request for the metaverse content, as described herein.

As further shown in FIG. 9, process 900 may include transmitting, to the remote service, at least one capability indication associated with the device (block 930). For example, the user device may transmit, to the remote service, at least one capability indication associated with the device, as described herein.

As further shown in FIG. 9, process 900 may include transmitting, to the remote service, at least one preference associated with a user of the device (block 940). For example, the user device may transmit, to the remote service, at least one preference associated with a user of the device, as described herein.

As further shown in FIG. 9, process 900 may include receiving, from the remote service and in response to the request, one or more packets encoding the metaverse content with a format that is based on the at least one capability indication and the at least one preference (block 950). For example, the user device may receive, from the remote service and in response to the request, one or more packets encoding the metaverse content with a format that is based on the at least one capability indication and the at least one preference, as described herein.

Process 900 may include additional implementations, such as any single implementation or any combination of implementations described below and/or in connection with one or more other processes described elsewhere herein.

In a first implementation, the at least one capability indication is associated with a battery level of the user device, a computing power of the user device, a connection status of the user device, a screen size of the user device, a haptic capability of the user device, or an audio capability of the user device.

In a second implementation, alone or in combination with the first implementation, the at least one preference is associated with an environmental awareness of the user, a location of the user, a disability of the user, one or more collaborators associated with the user, a privacy preference of the user, or a battery preference of the user.

In a third implementation, alone or in combination with one or more of the first and second implementations, the format of the metaverse content includes an LoD associated with one or more images included in the metaverse content.

In a fourth implementation, alone or in combination with one or more of the first through third implementations, the format of the metaverse content includes an amount of accessible text included in the metaverse content.

In a fifth implementation, alone or in combination with one or more of the first through fourth implementations, the format of the metaverse content includes a selection between voice prompts and tactile inputs associated with the metaverse content.

In a sixth implementation, alone or in combination with one or more of the first through fifth implementations, the format of the metaverse content includes an amount of tactile feedback included in the metaverse content.

In a seventh implementation, alone or in combination with one or more of the first through sixth implementations, the format of the metaverse content includes a level of content, external to a current PoV, included in the metaverse content.

In an eighth implementation, alone or in combination with one or more of the first through seventh implementations, process 900 includes decoding the one or more packets and delivering the metaverse content to the user based on decoding the one or more packets.

In a ninth implementation, alone or in combination with one or more of the first through eighth implementations, transmitting the at least one capability indication includes transmitting the at least one capability indication in a same message with the request.

In a tenth implementation, alone or in combination with one or more of the first through ninth implementations, transmitting the at least one preference includes transmitting the at least one preference in a same message with the request.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

FIG. 10 is a flowchart of an example process 1000 associated with continuing metaverse content across devices. In some implementations, one or more process blocks of FIG. 10 are performed by a remote service (e.g., the remote service 701). In some implementations, one or more process blocks of FIG. 10 are performed by another device or a group of devices separate from or including the remote service, such as one or more user devices (e.g., the user device(s) 730). Additionally, or alternatively, one or more process blocks of FIG. 10 may be performed by one or more components of device 800, such as processor 820, memory 830, input component 840, output component 850, and/or communication component 860.

As shown in FIG. 10, process 1000 may include receiving, from a first user device, a request for metaverse content (block 1010). For example, the remote service may receive, from a first user device, a request for metaverse content, as described herein.

As further shown in FIG. 10, process 1000 may include receiving, from the first user device, a first capability indication associated with the first user device (block 1020). For example, the remote service may receive, from the first user device, a first capability indication associated with the first user device, as described herein.

As further shown in FIG. 10, process 1000 may include selecting a first format for the metaverse content based on the first capability indication (block 1030). For example, the remote service may select a first format for the metaverse content based on the first capability indication, as described herein.

As further shown in FIG. 10, process 1000 may include transmitting, to the first user device and in response to the request for the metaverse content, one or more first packets encoding the metaverse content according to the first format (block 1040). For example, the remote service may transmit, to the first user device and in response to the request for the metaverse content, one or more first packets encoding the metaverse content according to the first format, as described herein.

As further shown in FIG. 10, process 1000 may include receiving, from a second user device, a request to continue the metaverse content (block 1050). For example, the remote service may receive, from a second user device, a request to continue the metaverse content, as described herein.

As further shown in FIG. 10, process 1000 may include receiving, from the second user device, a second capability indication associated with the second user device (block 1060). For example, the remote service may receive, from the second user device, a second capability indication associated with the second user device, as described herein.

As further shown in FIG. 10, process 1000 may include selecting a second format for the metaverse content based on the second capability indication (block 1070). For example, the remote service may select a second format for the metaverse content based on the second capability indication, as described herein.

As further shown in FIG. 10, process 1000 may include transmitting, to the second user device and in response to the request to continue the metaverse content, one or more second packets encoding the metaverse content according to the second format (block 1080). For example, the remote service may transmit, to the second user device and in response to the request to continue the metaverse content, one or more second packets encoding the metaverse content according to the second format, as described herein.

Process 1000 may include additional implementations, such as any single implementation or any combination of implementations described below and/or in connection with one or more other processes described elsewhere herein.

In a first implementation, process 1000 includes transmitting, to the first user device, an indication that the metaverse content is continuing on the second user device.

In a second implementation, alone or in combination with the first implementation, process 1000 includes receiving, from the second user device, a set of credentials associated with a same user as is associated with the first user device and determining to continue the metaverse content based on the set of credentials.

In a third implementation, alone or in combination with one or more of the first and second implementations, the first capability indication is associated with a battery level of the first user device, a computing power of the first user device, a connection status of the first user device, a screen size of the first user device, a haptic capability of the first user device, or an audio capability of the first user device.

In a fourth implementation, alone or in combination with one or more of the first through third implementations, the first format of the metaverse content includes one or more of an LoD associated with one or more images included in the metaverse content, an amount of accessible text included in the metaverse content, a selection between voice prompts and tactile inputs associated with the metaverse content, an amount of tactile feedback included in the metaverse content, or a level of content, external to a current PoV, included in the metaverse content.

In a fifth implementation, alone or in combination with one or more of the first through fourth implementations, process 1000 includes determining one or more differences between the first user device and the second user device, based on the first capability indication and the second capability indication, and selecting the second format based on the first format and based on the one or more differences between the first user device and the second user device.

Although FIG. 10 shows example blocks of process 1000, in some implementations, process 1000 includes additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, at a device, input indicating metaverse content;

transmitting, to a remote service, a request for the metaverse content;

transmitting, to the remote service, at least one capability indication associated with the device;

transmitting, to the remote service, at least one preference associated with a user of the device; and receiving, from the remote service and in response to the request, one or more packets encoding the metaverse content, wherein a format of the metaverse content is based on the at least one capability indication and the at least one preference, wherein the format of the metaverse content includes a level-of-detail associated with one or more images included in the metaverse content.

2. The method of claim 1, wherein the at least one capability indication is associated with a battery level of the device, a computing power of the device, a connection status of the device, a screen size of the device, a haptic capability of the device, or an audio capability of the device.

3. The method of claim 1, wherein the at least one preference is associated with an environmental awareness of the user, a location of the user, a disability of the user, one or more collaborators associated with the user, a privacy preference of the user, or a battery preference of the user.

4. The method of claim 1, wherein the format of the metaverse content further includes an amount of accessible text included in the metaverse content.

5. The method of claim 1, wherein the format of the metaverse content further includes a selection between voice prompts and tactile inputs associated with the metaverse content.

6. The method of claim 1, wherein the format of the metaverse content further includes an amount of tactile feedback included in the metaverse content.

7. The method of claim 1, wherein the format of the metaverse content further includes a level of content, external to a current point-of-view, included in the metaverse content.

8. The method of claim 1, further comprising:

decoding the one or more packets; and delivering the metaverse content to the user based on decoding the one or more packets.

9. The method of claim 1, wherein transmitting the at least one capability indication comprises:

transmitting the at least one capability indication in a same message with the request.

10. The method of claim 1, wherein transmitting the at least one preference comprises:

transmitting the at least one preference in a same message with the request.

11. A device, comprising:

one or more memories; and one or more processors, communicatively coupled to the one or more memories, configured to:

receive, from a first user device, a request for metaverse content;

receive, from the first user device, a first capability indication associated with the first user device;

select a first format for the metaverse content based on the first capability indication;

transmit, to the first user device and in response to the request for the metaverse content, one or more first packets encoding the metaverse content according to the first format;

receive, from a second user device, a request to continue the metaverse content;

receive, from the second user device, a second capability indication associated with the second user device;

select a second format for the metaverse content based on the second capability indication; and transmit, to the second user device and in response to the request to continue the metaverse content, one or more second packets encoding the metaverse content according to the second format.

12. The device of claim 11, wherein the one or more processors are further configured to:

transmit, to the first user device, an indication that the metaverse content is continuing on the second user device.

13. The device of claim 11, wherein the one or more processors, to receive the request to continue the metaverse content, are configured to:

receive, from the second user device, a set of credentials associated with a same user as is associated with the first user device; and determine to continue the metaverse content based on the set of credentials.

14. The device of claim 11, wherein the first capability indication is associated with a battery level of the first user device, a computing power of the first user device, a connection status of the first user device, a screen size of the first user device, a haptic capability of the first user device, or an audio capability of the first user device.

15. The device of claim 11, wherein the first format of the metaverse content includes one or more of:

a level-of-detail associated with one or more images included in the metaverse content;

an amount of accessible text included in the metaverse content;

a selection between voice prompts and tactile inputs associated with the metaverse content;

an amount of tactile feedback included in the metaverse content; or a level of content, external to a current point-of-view, included in the metaverse content.

16. The device of claim 11, wherein the one or more processors, to select the second format, are configured to:

determine one or more differences between the first user device and the second user device based on the first capability indication and the second capability indication; and select the second format based on the first format and based on the one or more differences between the first user device and the second user device.

17. A non-transitory computer-readable medium storing a set of instructions, the set of instructions comprising:

one or more instructions that, when executed by one or more processors of a device, cause the device to:

receive, from a user device, a request for metaverse content;

receive, from the user device, at least one capability indication associated with the user device;

receive at least one preference associated with a user of the user device;

select a format for the metaverse content based on the at least one capability indication and the at least one preference, wherein the format of the metaverse content includes a level-of-detail associated with one or more images included in the metaverse content; and transmit, to the user device and in response to the request, one or more packets encoding the metaverse content according to the format.

18. The non-transitory computer-readable medium of claim 17, wherein the at least one capability indication is associated with a battery level of the device, a computing power of the device, a connection status of the device, a screen size of the device, a haptic capability of the device, or an audio capability of the device.

19. The non-transitory computer-readable medium of claim 17, wherein the at least one preference is associated with an environmental awareness of the user, a location of the user, a disability of the user, one or more collaborators associated with the user, a privacy preference of the user, or a battery preference of the user.

* * * * *